Nov. 9, 1954  R. L. BISHOP ET AL  2,693,928
TAPE SUSPENSION FOR INSTRUMENTS AND THE LIKE
Filed Oct. 16, 1948  2 Sheets-Sheet 1
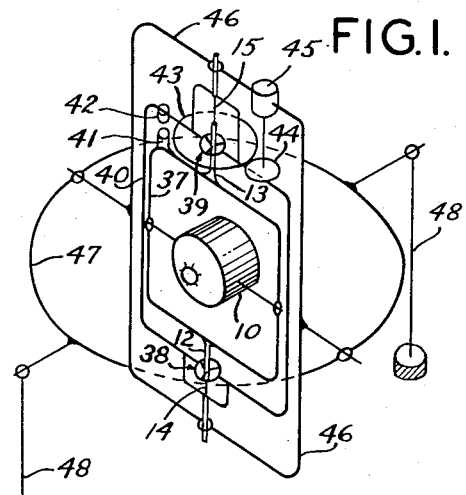
FIG. 1.
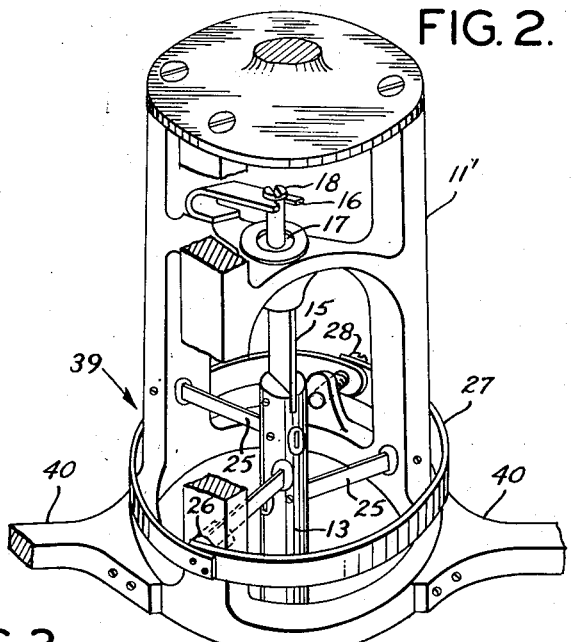
FIG. 2.
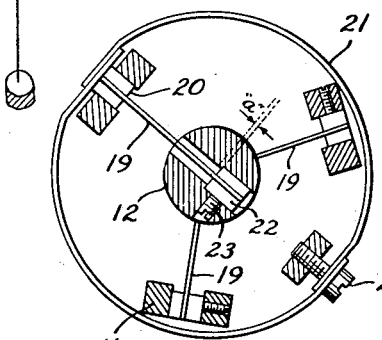
FIG. 3.
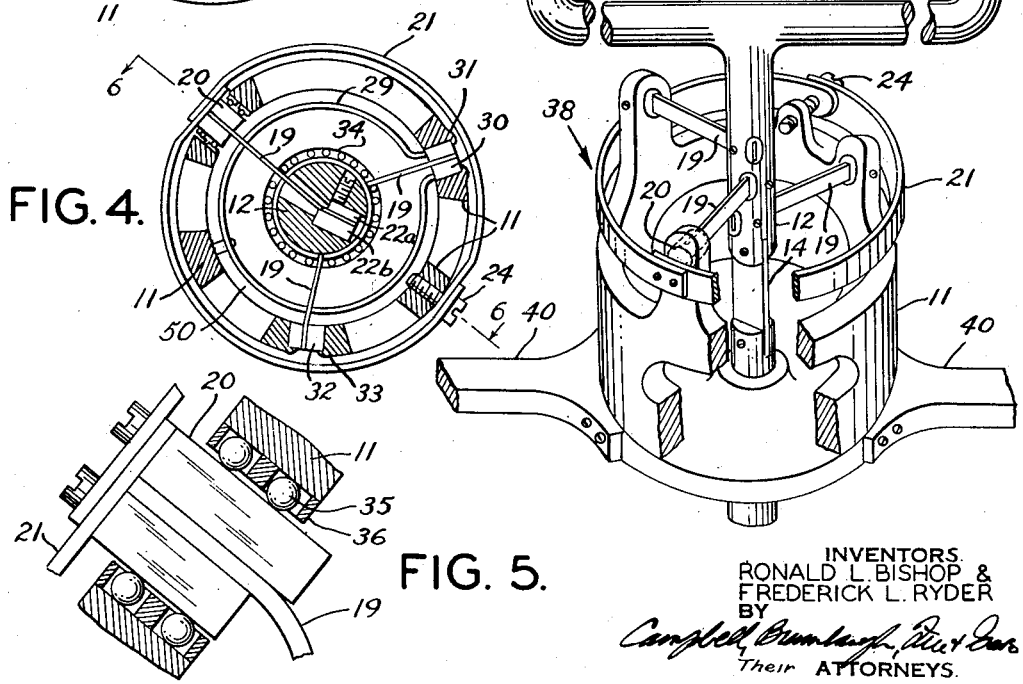
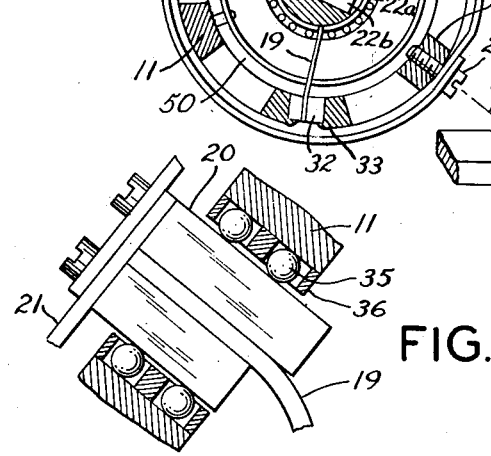
FIG. 4.
FIG. 5.
INVENTORS.
RONALD L. BISHOP &
FREDERICK L. RYDER
BY
Their ATTORNEYS.

Nov. 9, 1954 R. L. BISHOP ET AL 2,693,928
TAPE SUSPENSION FOR INSTRUMENTS AND THE LIKE
Filed Oct. 16, 1948 2 Sheets-Sheet 2

INVENTORS.
RONALD L. BISHOP &
FREDERICK L. RYDER
BY
*Campbell, Brumbaugh, Free, Graves*
Their ATTORNEYS.

United States Patent Office 2,693,928
Patented Nov. 9, 1954

2,693,928

TAPE SUSPENSION FOR INSTRUMENTS AND THE LIKE

Ronald L. Bishop, Oceanside, and Frederick L. Ryder, Lynbrook, N. Y., assignors to American Bosch Arma Corporation, Brooklyn, N. Y., a corporation of New York Application October 16, 1948, Serial No. 54,878

15 Claims. (Cl. 248—317)

The subject matter of this patent may be used by or for the Government for governmental purposes without the payment of any royalties.

This invention relates to suspensions for instruments and the like, and has particular reference to an improved torsion tape suspension for gyroscopes although the invention is not limited to that use.

Conventional suspensions using ball bearings offer little rotational friction and restoring torque, but are subject to inherent errors such as play between the elements of the bearing, and irregularities in the balls and races, which cause the position of the instrument shaft center to change. Also the bearings suffer permanent set under comparatively small loads, and thrust loads result in frictional loss in the ball bearings, so that such conventional suspensions are generally unsatisfactory where precision mounting of an instrument is required.

In accordance with the present invention a precision suspension for sensitive instruments such as gyroscopes is provided which is enabled to stand large axial and radial loads without resistance to torsional movement of the instrument and in which the position of the instrument shaft always remains centered or otherwise positioned under normal loads.

In a preferred embodiment of the invention, the instrument is suspended by and between two vertically aligned tape suspension elements, each comprising a flat vertical strip interposed between the vertical supporting shaft of the instrument and its mounting frame, and three horizontal tapes spaced 120° apart and interposed between the vertical instrument supporting shaft and a suitable frame, with one of the horizontal tapes being connected to a tuning spring which is so preloaded as to maintain a constant and equal tension on the radial tapes under all normal operating conditions, thereby insuring reduction of torsional resistance to a minimum approaching zero.

It will be seen that the tape suspension of this invention supports a mechanism in a manner such that no resistance is offered to a torsional movement of the mechanism and that the suspension offers a very low restoring torque to torsional loads over small angles, and no rubbing friction, and hence no dissipation of energy. The position of the shaft of the suspended mechanism always remains closely positioned under normal loads, and in addition, the tape suspension is able to withstand large axial and radial loads.

For a more complete understanding of the invention, reference may be had to the accompanying drawings in which:

Figure 1 is a schematic diagram of a gyrocompass in which the tape suspension of this invention is used to support the sensitive element;

Fig. 2 is an enlarged perspective view of the tape suspension of this invention;

Fig. 3 shows the arrangement of the radial tapes about the shaft;

Fig. 4 shows a method of securing the tapes and certain additional features of the tape suspension;

Fig. 5 is an enlarged axial section through the arrangement for installing the sliding plug supporting the outer end of the corresponding radial tape.

Figure 6:
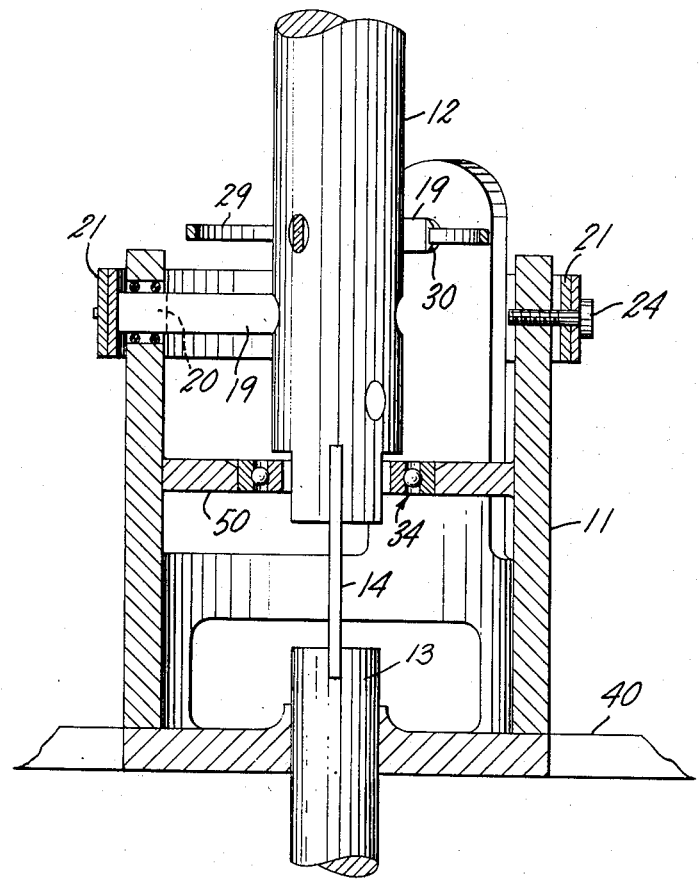
Fig. 6 is a longitudinal view, partly in elevation, taken on the line 6—6 of Fig. 4.

Referring to Fig. 1, the gyro casing 10 is journaled in azimuth gimbal ring 37 carrying opposite vertical shafts 12 and 13 connected to the two elements of the tape or filament suspension 38 and 39, respectively, which are fastened in the azimuth follow-up gimbal ring 40. Attached to azimuth gimbal ring 37 and the azimuth follow-up gimbal ring 40 are pick-up coils 41 and 42, respectively. Also attached to azimuth follow-up gimbal ring 40 is gear 43 meshing with pinion 44 which is driven by follow-up motor 45 secured to pitch gimbal ring 46 in which azimuth follow-up gimbal ring 40 is journaled and is kept parallel to the azimuth gimbal ring 37 by the action of follow-up motor 45 actuated by pick-up coils 41 and 42, turning gears 44 and 43. Pendulous pitch gimbal ring 46 is journaled in the roll gimbal ring 47 which, in turn, is journaled in supports 48 mounted on the deck of a ship, for example.

The tape suspension 38, 39 allows the azimuth gimbal ring 37 to rotate with no resistance opposing its rotation. Angular displacement of the azimuth gimbal ring 37 from alignment with the azimuth follow-up gimbal ring 40 results in generation of a voltage by pick-up coils 41, 42, which is amplified and fed to follow-up motor 45, whereby the azimuth follow-up gimbal ring 40 is driven by follow-up motor 45 in the direction which reduces this displacement to zero. This action is well-known and is so arranged as to always keep the rotation of azimuth gimbal ring 37 in the tape suspension elements 38, 39 within the limits of intended operation.

Referring to Fig. 2, showing details of the two elements 38, 39 of the tape suspension as used in Fig. 1 for supporting the shafts 12 and 13 of azimuth gimbal ring 37 in azimuth follow-up gimbal ring 40, it is seen that the elements 38 and 39 are secured to the azimuth follow-up gimbal ring 40 by frames 11 and 11', respectively, into the centers of which extend the lower and upper aligned shafts 12 and 13 of the azimuth gimbal ring carrying the sensitive element, in this case, gyroscope 10.

Attached to the lower end of shaft 12 is end tape 14 consisting of a flat flexible strip of steel or other suitable material, the lower end of which is secured to the frame 11, as shown. Attached to the upper end of shaft 13 is a like end tape 15 the upper end of which is secured to plug 17, free to slide axially in frame 11' and urged normally upwardly by a spring mounted at one end on frame 11' and engaging at its other end the screw 18, threaded in plug 17, which applies the upward force of spring 16 through plug 17 to end tapes 15 and 14.

Also attached to shaft 12 are three radial tapes 19, spaced axially along the shaft 12 and angularly spaced 120° apart, of steel or the like, and each held in position by being clamped between half-round plugs 22 held in place in shaft 12 by a set screw 23 as best shown in Fig. 3. The outer ends of two of the tapes 19 are attached to frame 11 in a similar manner. As also shown in Fig. 3, the outer end of the third radial tape 19 of lower tape suspension element 38 is attached to split plug 20 free to move radially in frame 11 and to the outer end of plug 20 is attached tuning spring 21, which is secured to frame 11 by adjusting screw 24 diametrically opposite plug 20.

The radial tapes 25 of the upper tape suspension element 39 are similarly attached to shaft 13, 120° apart, and the outer ends of two tapes 25 are clamped to frame 11', and the outer end of the third tape 25 is clamped to sliding plug 26 in the same way as described in connection with lower suspension element 38. The outer end of plug 26 is attached to turning spring 27 which is attached to frame 11' by adjusting screw 28, diametrically opposite plug 26. By proper turning of adjusting screws 24 and 28, radial tapes 19 and 25 are put into tension by the action of plugs 20 and 26 and tuning springs 21 and 27, as will be described.

In operation of the tape suspension of this invention, its elements 38 and 39 support the sensitive element carried by shafts 12 and 13 of azimuth gimbal ring 37 in a manner whereby the tape suspension withstands large axial and radial loads and yet offers very small resistance to torsional load over the range of operation. The sensitive instrument 10 may be subjected to external forces caused by gravity, acceleration due to shock or other effects. In general, any such force can be resolved into forces axial and radial to shafts 12 and 13.

Due to the action of the end spring 16 the tension in upper end tape 15 remains substantially constant during the application of normal axial forces, so that an axial force either increases or decreases the tension in the lower end tape 14, depending on the direction of the force. Accordingly, the preloading of end spring 16 is maintained such that lower end tape 14 is always kept under tension during any expected axial force. The purpose of end spring 16 is to ensure that end tapes 14 and 15 are always maintained under tension in spite of minute dimensional changes of shafts 12 and 13, frames 11 and 11' and gimbal rings 37 and 40, such as those caused by temperature changes, mechanical creep or similar effects.

In a somewhat similar way, radial forces increase or decrease the tension in certain of the radial tapes 19 and 25 depending on the direction of the force. The action of tuning springs 21 and 27 is such that, under normal loads, the tension in the radial tapes 19 and 25 which are connected to sliding plugs 20 and 26 does not vary appreciably. The preloading of springs 21 and 27 must be of such magnitude that the radial tapes 19 and 25 are always under tension during any expected radial force. One purpose of the tuning springs 21 and 27 is to insure that the tension in the radial tapes 19 and 25 is unaffected by minute dimensional changes of the shafts 12 and 13, frames 11 and 11', azimuth gimbal ring 37, and azimuth follow-up gimbal ring 40, such as those changes produced by temperature variations, mechanical creep or similar causes.

Inasmuch as the radial tapes are arranged 120° apart, tuning spring 21 produces equal tension in each tape 19 of lower unit 38, and tuning spring 27 produces equal tension in each tape 25 of upper unit 39. By turning adjusting screws 24 and 28, thereby adjusting the tension in radial tapes 19 and 25, the tape suspension can be "tuned," which is the tension adjustment which reduces the torsional resistance of the suspension to possible zero, as will now be explained.

The resistance of the suspension to a torsional load is composed of frictional torque and stiffness torque. The frictional torque can be made negligible by clamping the radial tapes 19 and 25 in a manner that permits no sliding or rubbing at either end of the tapes when the shafts 12 and 13 rotate a few degrees. The stiffness torque can be regarded as composed of three effects (1) torsional stiffness of the end tapes 14 and 15, (2) flexural resistance of the radial tapes 19 and 25, and (3) torque caused by the tension in the radial tapes 19 and 25. The last of these effects can be made to oppose the other two by clamping the radial tapes 19 and 25 to the shafts 12 and 13 at a position beyond the center of the shafts 12 and 13, as represented in Fig. 3 by the distance "a." The torque caused by the tension in the tapes 19 and 25 is an upsetting torque, that is, it acts to increase the angular displacement. By proper selection of the distance "a" and by proper "tuning" or setting of adjustment screws 24 and 28, the total stiffness can be reduced to any desired value. Reduction of the total stiffness of the tape suspension to zero, therefore, is accomplished by adjusting the tension in the radial tapes 19 and 25 so that the "upsetting" torque due to the tension in radial tapes 19 and 25 is equal and opposite to the restoring torque due to torsional stiffness of end tapes 14 and 15 and flexural resistance of the radial tapes 19 and 25.

Referring to the modification of Fig. 4, the radial tapes 19, which are attached to the frame 11 in Fig. 2 here terminate in plugs 30 and 32, plug 30 being forced against stop 31 by spring 29, and plug 32 being forced against stop 33 by a similar spring, each spring exerting a force great enough to prevent plugs 30 and 32 from moving under normal operating conditions. However, under radial shock, the tension in the radial tape 19 which is connected to plug 30 may exceed the force of spring 29, so that plug 30 moves from stop 31, allowing shaft 12 to move slightly, until it comes in contact with ball bearing 34 which then resists the shock. Suitable clearance is provided between shaft 12 and bearing 34 to prevent the resisting torque of bearing 34 from being applied to shaft 12 under normal operating conditions. As best seen in Fig. 6 the bearing 34 is, through a plate 50, supported by the frame 11 and is preferably located near the end of the shaft 12. Shaft 12 may be slightly reduced in diameter at the bearing 34 to afford the necessary radial clearance within the bearing and to provide a shoulder to engage the inner race of the bearing upon axial displacement, thereby resisting axial shock and protecting the end tape 15. The other two radial tapes 19 are similarly protected from shock. The tape 19 which is connected to plug 32 is protected by a spring similar to spring 29, whereas the tape 19 which is connected to plug 20 is protected by the tuning spring 21. A similar arrangement of a bearing surrounding the shaft 13 is utilized to take up the radial shock on shaft 13, and to protect the end tape 14 from axial shock.

Where the tapes are clamped to the shaft 12 in the manner shown in Fig. 3, the radial tapes 19 bear on either one or the other half-round plugs 22, depending on the direction of rotation. Inasmuch as the leading edges of both of the half-round plugs 22 cannot be exactly the same distance "a" from the shaft center, and and as the clamping is at best imperfect at the leading edges due to the inevitable rounding of those edges, it has been found advisable to arrange the plug-tape combination so that the tape 19 always disengages the same half-round plug 22. This is accomplished by displacing the plugs 20, 30 and 32 angularly by a few degrees more than the angle of normal operation to one side of the neutral position so that the tapes 19 never quite straighten out. This displacement, which is shown greatly exaggerated in Fig. 4, is in opposite directions for shaft 12 and shaft 13 in order that the net torque on the azimuth gimbal ring 37 is zero, in the mounting shown in Figs. 1 and 2.

It also has been found desirable to recess the leading edge of the half-round 22a very slightly behind the leading edge of the other half-round 22b, in order to insure that the radial tape 19 is firmly clamped precisely at the edge of the leading half-round 22a. Should the recess be in the other direction, the tape 19 will bend over an edge against which it is not tightly clamped, thus causing rubbing and consequent frictional torque. The same arrangement is used on the outer ends of the radial tapes.

There is a possibility that in the arrangement of Fig. 3, the sliding plug 20 may bind in frame 11 due to the net tangential force in the two halves of tuning spring 21, so that the tension in tapes 19 and 25 is indeterminate and hence affects the tuning in an erratic manner. This binding can be minimized by the use of a ball bearing in the manner shown by Fig. 5, wherein the retainer 36 holding the balls 35 is pressed into frame 11 and the holes in retainer 36 are such as to allow the balls 35 to roll axially along plug 20 and thereby permit plug 20 to move freely in a direction radial to shaft 12.

Although the tape suspension of this invention has been illustrated and described as supporting a mechanism, such as an azimuth gyro, by vertical shafts, such as those on the azimuth gimbal ring, its use is not limited to that mechanism nor to that position. If the component containing end spring 16 is below the suspended mechanism, it is not necessary that the end spring 16 be as strong as in the arrangement described. When the mechanism lies in a horizontal position the weight of the mechanism is supported by the radial tapes, causing unbalanced tensions in the radial tapes, but this does not affect operation, since the suspension is tuned with the mechanism in place, and so the total torsional resistance can still be made to closely approach zero. Although each individual radial tape may not cause an "upsetting" torque which is always equal to that of each other tape, the total contribution of the six radial tapes produces the desired result. However, the value of "a" can be varied for each radial tape in order to cause the upsetting torque of each radial tape to be essentially equal to that of the others.

It will be understood that the invention is not limited to the illustrative embodiments illustrated and described, but is susceptible of variations in form and detail within the scope of the appended claims.

We claim:

1. In combination with a filament suspending a relatively free body for torsional movement about a given axis on a support, at least two laterally flexible longitudinal members extending between said body and said support, each of said members being attached to said free body on the far side of the axis of torsional movement from the point of attachment of the member to the support, and a resilient element reacting between said support and at least one of said members for applying a load longitudinally thereof.

2. In combination with a filament suspending a relatively free body for torsional movement about a given axis on a support, at least two laterally flexible longitudinal members extending between said body and said support, each of said members being attached to said free body on the far side of the axis of torsional movement from the point of attachment of the member to the support, a resilient element reacting between said support and at least one of said members for applying tension longitudinally thereof, and means for adjusting said element to vary the tension on said members.

3. In combination with a filament suspending a relatively free body for torsional movement about a given axis on a support, at least two laterally flexible longitudinal members extending between said body and said support, each of said members being attached to said free body on the far side of the axis of torsional movement from the point of attachment of the member to the support, a movable connector interposed between at least one of said members and said support and movable with the former relatively to said support, and a resilient element reacting between said support and said connector for applying tension longitudinally of said members.

4. In combination with a filament suspending a relatively free body for torsional movement about a given axis on a support, a plurality of equally-spaced, laterally flexible, longitudinal members extending between said body and said support, each of said members being attached to said free body on the far side of the axis of torsional movement from the point of attachment of the member to the support, a plug movably mounted in an aperture in said support and interposed between one of said members and said support, and a resilient element reacting between said support and said plug for applying tension longitudinally of said members.

5. In combination with a filament suspending a relatively free body for torsional movement about a given axis on a support, at least three equally-spaced, laterally flexible, longitudinal members extending between said body and said support, each of said members being attached to said free body on the far side of the axis of torsional movement from the point of attachment of the member to the support, and a resilient element reacting between said support and at least one of said members for applying a load longitudinally and equally on said three members.

6. In combination with a filament suspending a relatively free body for torsional movement about a given axis on a support, a plurality of spaced, laterally flexible, longitudinal members extending between said body and said support, each of said members being attached to said free body on the far side of the axis of torsional movement from the point of attachment of the member to the support, a movable connector interposed between each of said members and said support, a resilient element reacting between said support and the connector of at least one of said members for applying a load longitudinally thereof, and stop means limiting the movement of the remainder of said connectors relatively to said support.

7. In combination with a filament suspending a relatively free body for torsional movement about a given axis on a support, a plurality of spaced, laterally flexible, longitudinal members extending between said body and said support, each of said members being attached to said free body on the far side of the axis of torsional movement from the point of attachment of the member to the support, a movable connector interposed between each of said members and said support, a resilient element reacting between said support and the connector of at least one of said members for applying a load longitudinally thereof, and stop means limiting the movement of the remainder of said connectors and the corresponding members longitudinally in opposite directions relatively to said support.

8. In combination with a filament suspending a relatively free body for torsional movement about a given axis on a support, at least two laterally flexible, longitudinal members extending between said body and said support, each of said members being attached to said free body on the far side of the axis of torsional movement from the point of attachment of the member to the support, a movable connector interposed between at least one of said members and said support and movable with the former relatively to said support, a resilient element reacting between said support and said connector for applying a load longitudinally thereof, and antifriction means interposed between said connector and said support.

9. In combination with a filament suspending a relatively free body for torsional movement about a given axis on a support, at least two laterally flexible longitudinal tape members extending between said body and said support, each of said members being attached to said free body on the far side of the axis of torsional movement from the point of attachment of the member to the support, a clamping means engaging the opposite flat sides of at least one end of each of said tape members and offset longitudinally of said tape at the said opposite sides thereof, and a resilient element reacting between said support and at least one of said tape members for applying tension longitudinally thereof.

10. In combination with a filament suspending a relatively free body for torsional movement about a given axis on a support, means interposed between said support and said filament and resilient axially of the latter, at least two laterally flexible longitudinal members extending between said body and said support, each of said members being attached to said free body on the far side of the axis of torsional movement from the point of attachment of the member to the support, and a resilient element reacting between said support and at least one of said members for applying a load longitudinally thereof.

11. In combination with a filament suspending a relatively free body for torsional movement about a given axis on a support, at least two laterally flexible, longitudinal members extending between said body and said support, each of said members being attached to said free body on the far side of the axis of torsional movement from the point of attachment of the member to the support, a resilient element reacting between said support and at least one of said members for applying a load longitudinally thereof, a second filament coaxial with said first filament for connecting the lower end of said body to said support, and a second set of at least two laterally flexible longitudinal members extending between said body and said support adjacent said second filament.

12. In combination, a support, a body mounted in the support for torsional movement about a given axis, at least two laterally flexible longitudinal members in tension extending between the body and the support with directional components normal to the axis of torsional movement, and means attaching each of said members to said body on the far side of the axis of torsional movement from the point of attachment of the respective members to the support.

13. In combination, a support, a body mounted in the support for torsional movement about a given axis, a first set of at least two laterally flexible longitudinal members in tension extending between the body and the support with directional components normal to the axis of torsional movement and attached to the body on the far side of the axis of torsional movement from the respective points of attachment of the members to the support, the points of attachment of the members to the support being displaced angularly about the axis of torsional movement of the body to place torque on the body in a given angular direction, and a second set of at least two laterally flexible longitudinal members having directional components normal to the axis of torsional movement and in tension between the support and the body and attached to the body on the far side of the axis of torsional movement from the respective points of attachment of the members to the support, the points of attachment of the second set of members to the support being displaced angularly about the axis of torsional movement to place torque on the body in an angular direction countering the torque applied by the first set of members.

14. The combination as set forth in claim 13, said laterally flexible longitudinal members in tension comprising tapes, and said means for attaching the tapes to said support and to said body including respectively flat clamping members at opposite sides of said tapes and offset longitudinally of the tape on opposite sides thereof, the clamping members being offset so that the tape member bends around the edge of a recessed clamping member in each case.

15. The combination as set forth in claim 14, the laterally flexible longitudinal members of each set being three in number and equi-angularly spaced about the axis of torsional movement of the body, and means for applying tension to at least one of the members including an adjustable resilient element reacting between the support and said one member.

References Cited in the file of this patent

UNITED STATES PATENTS

| Number | Name | Date |
|---|---|---|
| Re. 22,330 | Draper | June 8, 1943 |
| 799,733 | Hartman | Sept. 19, 1905 |
| 1,015,434 | Gray | June 23, 1912 |
| 1,210,085 | Leblanc | Dec. 26, 1916 |
| 1,435,763 | Townsend | Nov. 14, 1922 |
| 2,291,612 | Draper | Aug. 4, 1942 |

FOREIGN PATENTS

| Number | Country | Date |
|---|---|---|
| 9,351 | Great Britain | of 1906 |
| 382,834 | Germany | of 1923 |